UNITED STATES PATENT OFFICE.

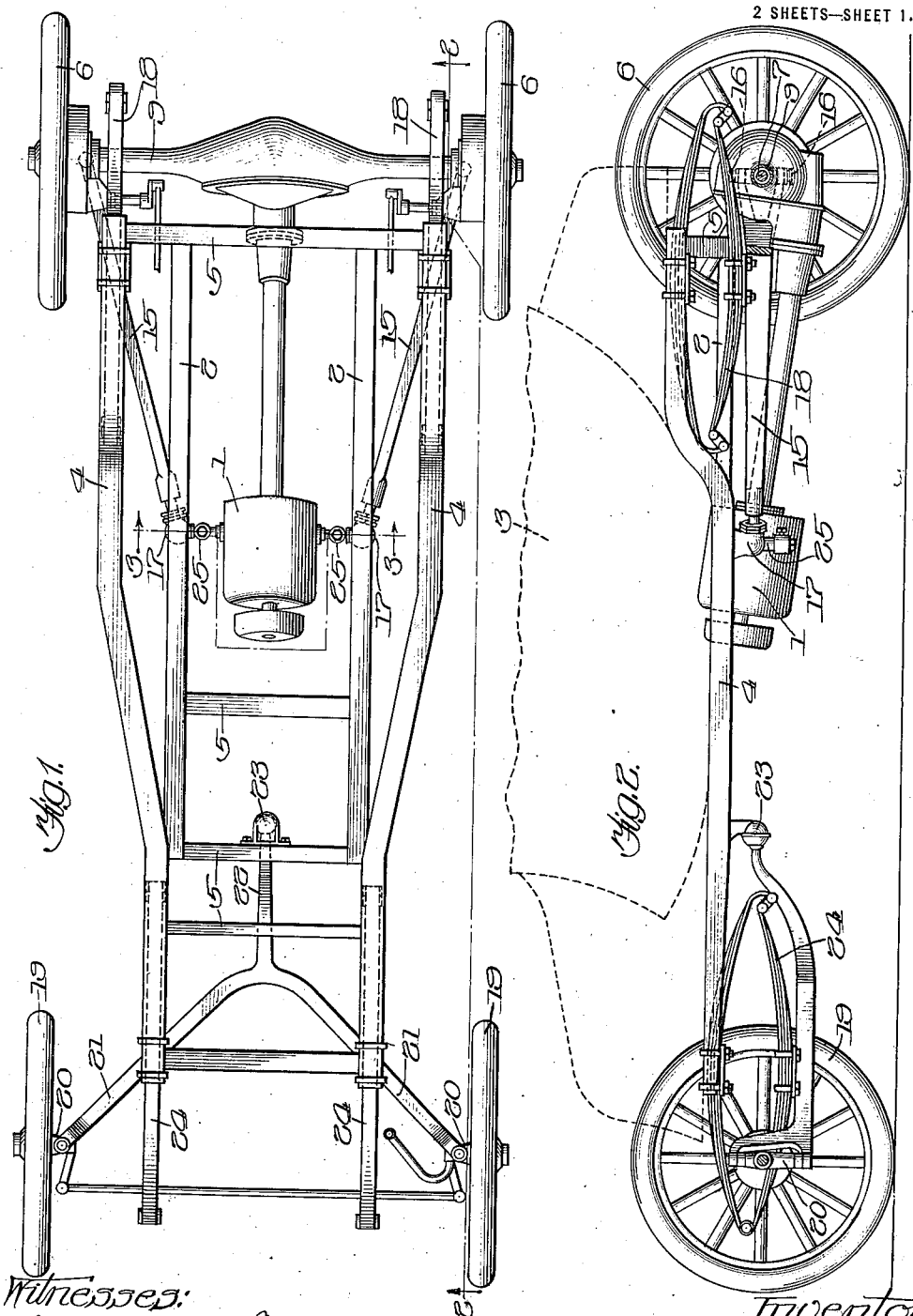

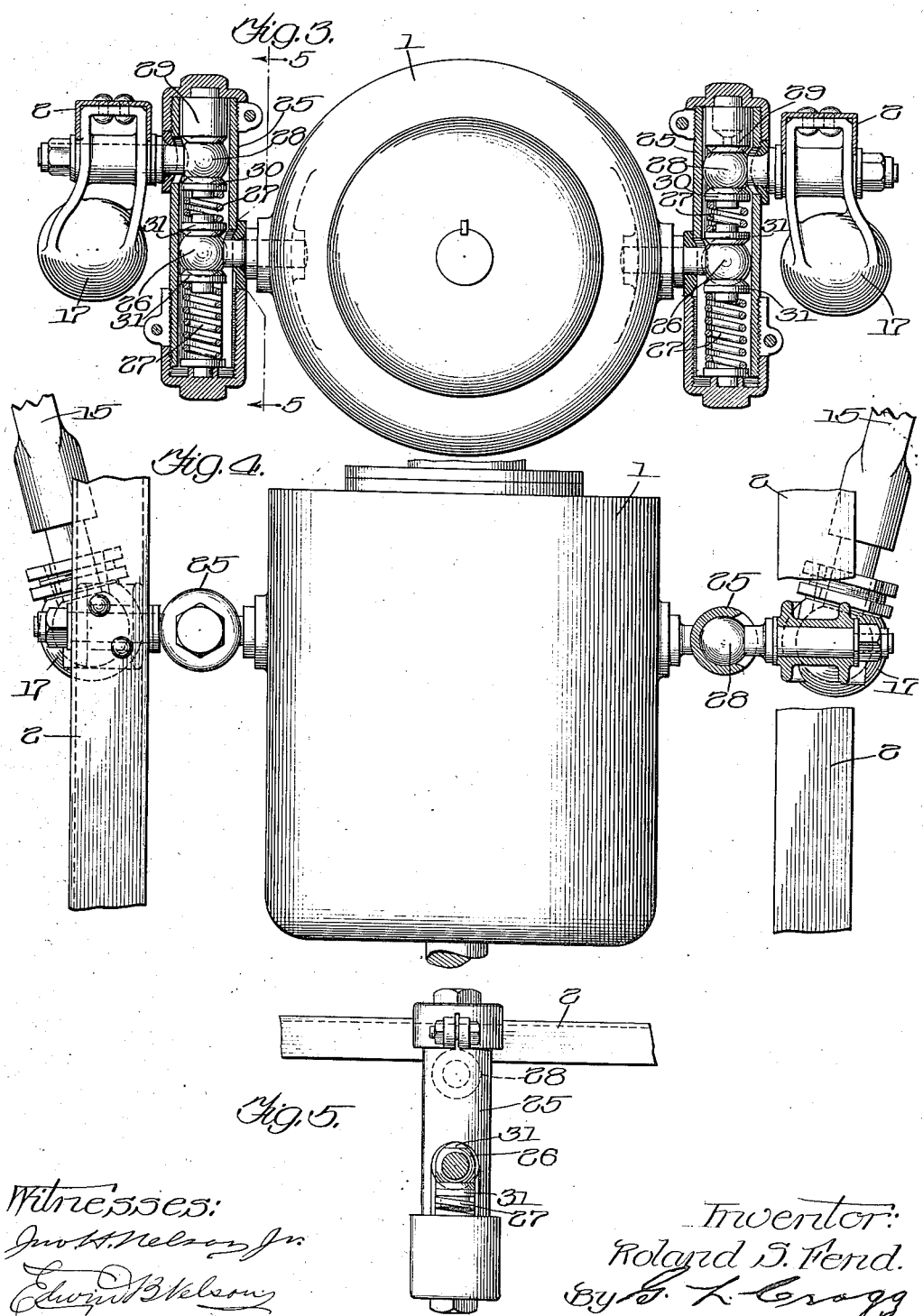

ROLAND S. FEND, OF CHICAGO, ILLINOIS.

AUTOMOBILE.

1,178,144.           Specification of Letters Patent.        Patented Apr. 4, 1916.

Application filed October 23, 1913. Serial No. 796,769.

*To all whom it may concern:*

Be it known that I, ROLAND S. FEND, citizen of the United States, residing at Chicago, in the county of Cook and State of Illinois, have invented a certain new and useful Improvement in Automobiles, of which the following is a full, clear, concise, and exact description, reference being had to the accompanying drawings, forming a part of this specification.

My invention relates to automobiles and has for its general object the provision of an improved mounting for the motors, one feature of the invention embodying certain structural characteristics embraced in my copending application Serial No. 796,768, filed October 23, 1913, (Case A), many of the features herein disclosed being claimed in my said co-pending application.

In accordance with one feature of the invention the motor or engine is journaled in supports depending from the under frame of the automobile, these supports in turn being preferably journaled upon the under frame at places above the journals of the engine or motor. The connecting devices that join the pendant motor supports with the under frame are desirably in the form of universal joints and the journals for the motor or engine in said pendant supports are also desirably in the form of universal joints. The pendant supports are desirably tubular to contain springs that serve yieldingly to hold the motor bearings in relation to the bearings for the pendant motor supports, whereby vertical movement of the floating motor journals with respect to the journals for the pendant motor support may occur to cushion the motor against shocks. Where the invention includes features disclosed in my said co-pending application there are employed reach rods connected at their rear ends to the driving shaft casing and at their forward ends to the under frame, the connections at the latter places being effected by universal joints whose centers are desirably included in the normal axis of the motor journals, though it is to be understood that the invention is not to be limited to those automobiles in which the rear wheels are the motor driven wheels.

I will explain my invention more fully by reference to the accompanying drawings showing the preferred embodiment thereof and in which—

Figure 1 is a plan view showing the under frame mounted upon wheels and in condition to have the vehicle body supported thereupon; Fig. 2 is a sectional elevation on line 2 2 of Fig. 1 with the addition of the lower part of the vehicle body in position upon the under frame; Fig. 3 is a sectional elevation on line 3 3 of Fig. 1; Fig. 4 is a plan view, partially in section, showing certain of the parts illustrated in Figs. 1, 2 and 3; and Fig. 5 is a sectional elevation on line 5 5 of Fig. 3.

Like parts are indicated by similar characters of reference throughout the different figures.

The particular automobile illustrated is one which employs an electric motor 1 mounted upon the motor supports 2 which are rigid with respect to and form a part of the under frame of the vehicle, the vehicle body 3 being mounted upon laterally outsetting portions 4 of the under frame. Braces 5 join the frame members 2, the rear brace 5 being projected laterally there to unite the outer members 4 with the inner members 2, the forward ends of the members 2 being directly fastened to the forward portions of the members 4. A rigid under frame structure is thus produced which not only supports the vehicle body 3 and motor 1 but which may support other equipment of the automobile as, for example, storage batteries in the case of automobiles employing propelling electric motors. In the embodiment of the invention illustrated the rear wheels 6 are initially propelled by the motor 1 through the intermediation of any well known or suitable power transmission mechanism, that shown including a motor driven driving shaft 7 connected with central portions of the wheels 6. The driving shaft is provided with a non-rotating shaft casing 9, this shaft casing thus constituting a support carried by the rear wheels and non-rotating therewith. The rear ends of what are herein termed to be reach rods 15, such term being used though the reach rods do not extend to the forward end of the vehicle, are pivotally connected at 16 with the shaft casing 9, such reach rods being bifurcated for this purpose as indicated by dotted lines in Fig. 2. The forward ends of the reach rods 15 have flexible connection at 17 with the inner members 2 of the under frame, these flexible connections being preferably afforded by ball and socket joints to provide universal joints between the forward ends of the reach rods 15 and the under frame. The rear portion of the under frame is supported upon the wheels desirably through the intermediation of elliptic springs 18. These elliptic springs or other cushions are supported upon the reach rods between the ends of said reach rods, whereby the vehicle body 3 has supporting engagement with these rear cushions 18 and said rear cushions are in turn supported by the wheels of the vehicle, between the axes of the forward and rear wheels.

The forward wheels 19 are turned by their contact with the roadway, in accordance with common practice, these wheels being journaled in branches 20 forming parts of well known steering knuckle mechanism. The element 20 thus constitutes a support carried by the front wheels and non-rotating therewith. A pair of reach rods 21 is provided at the forward end of the vehicle, each front end of each reach rod being bifurcated as illustrated in Fig. 2 there to have pivotal connection with the associate steering knuckle portion 20 as indicated clearly in Fig. 2. The inner ends of the forward reach rods 21 are merged to constitute the branches of a Y-structure having a common stem 22 which is flexibly connected at its rear end by a ball and socket or other universal joint 23 with one of the forward cross pieces 5 of the under frame. The vehicle body supporting springs located at the forward portion of the structure are also desirably in the form of elliptic springs 24 having connection at their top portions with the forward end of the vehicle body under frame and at their bottom portions with the reach rods 21, the points of connection of the elliptic springs 24 (or other cushion support) with the vehicle body under frame and reach rods 21 being between the axes of the vehicle wheels.

As the invention is illustrated the points of attachment of the rear ends of the reach rods 15 with the shaft casing 9 are close to the planes of rotation of the rear wheels 6, the points of attachment of the forward ends of the forward reach rods 21 with the knuckle portions 20 and thereby with the cases for the spindles or the stub shafts of the forward wheels are brought close to the planes by rotation of the forward wheels. By this construction the amplitude of spring vibration is shortened in proportion to the shocks whereby the amplitude of movement of the under frame is correspondingly reduced to reduce the amplitude of consequent movement of the vehicle body and the vehicle motor which drives wheels 6. By connecting the outer ends of the rear reach rods close to the planes of rotation of the driving wheels the tendency to warp the driving wheels out of their normal planes due to the propelling action is materially reduced.

The motor 1 is journaled in cylindrical supports 25 depending from the vehicle body supporting frame portions 2. The motor journals are desirably in the form of balls 26 which are floatingly supported within the bores of the cylinders 25, springs 27 normally positioning the axes of rotation of the motor in line with the centers of the joints 17, that is the centers of the joints 17 are normally included in the journal axis of the motor. The supports 25 are preferably flexibly suspended from the frame members 2 to which end these frame members preferably carry balls 28, constituting parts of universal joints, upon which the supports 25 are carried at 29, the elements 29 being cupped to receive the upper portions of the balls 28 while cupped portions 30 are pressed upwardly against the bottom parts of the balls 28 by the upper springs 27, the elements 30 being similar in construction to the elements 31 between which the balls 26 are disposed. By this arrangement the motor 1 and the power transmission mechanism projecting therefrom readily adapt themselves to all of the varying relative positions of the under frame and the vehicle wheels, the reach rods 15 by means of their universal joints 17 located as described coöperating with the flexible suspension for the motor to this end.

I do not limit myself to the separate formation and separable relation of the vehicle body and under frame.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. An automobile including a vehicle body carrying frame; front and rear vehicle wheels for supporting said frame; a propelling motor in driving connection with some of the vehicle wheels and carried by the frame by flexible connection; a reach rod structure supported by the wheels that are initially driven by the motor; and having a universal thrust sustaining connection with said frame in substantially horizontal alinement with the motor carrying flexible connection; and a cushion support for said frame and supported by the reach rod structure.

2. An automobile including a vehicle body carrying frame; front and rear vehicle wheels for supporting said frame; a propelling motor in driving connection with some of the vehicle wheels and carried by the frame by flexible connection; a reach rod structure supported by the wheels, that are initially driven by the motor, and flexibly connected with the frame by universal joints whose centers are normally substantially included in the axis of rotation of the motor; and a cushion support for said frame and supported by the reach rod structure.

3. An automobile including a vehicle body carrying frame; front and rear vehicle wheels for supporting said frame; a propelling motor in driving connection with some of the vehicle wheels and carried by the frame by cushion supports permitting the motor bodily to move with respect to the frame; a reach rod structure supported by the wheels, that are initially driven by the motor, and flexibly connected with the frame by universal joints whose centers are normally substantially included in the axis of rotation of the motor; and a cushion support for said frame and supported by the reach rod structure.

4. An automobile including a vehicle body carrying frame, rear driving wheels partially supporting said frame, a rear axle housing, a propelling motor in driving connection with the rear wheels, a propeller shaft housing rigidly connecting the motor frame with the rear axle housing, a pair of pivoted supports depending from the vehicle frame, a pair of springs in said supports below the pivotal point for the supports, a motor frame carrying pivot mounted between the springs in said support whereby the motor frame pivots may have slight vertical reciprocation in the supports and slight horizontal reciprocation with respect to the frame, and additional thrust sustaining members extending between the vehicle frame and the rear axle housing and pivoted to the vehicle frame substantially on the horizontal line of the motor frame supporting pivots.

5. In an automobile, a vehicle frame and rear axle housing, a motor, a propeller shaft housing connecting the motor frame with the rear axle housing, supporting means for the motor permitting slight universal movement of the motor with respect to the vehicle frame, and reach rods extending between the rear axle housing and the frame and pivoted to the frame substantially in the horizontal axis of movement of said motor.

6. An automobile including a vehicle body carrying frame; front and rear vehicle wheels for supporting said frame; a propelling motor in driving connection with some of the vehicle wheels; means for floating the journals of the motor upon the frame; a reach rod structure supported by the wheels that are initially driven by universal joints whose centers are normally substantially included in the axis of rotation of the motor; and a cushion support for said frame and supported by the reach rod structure.

7. An automobile including a vehicle body carrying frame; front and rear vehicle wheels for supporting said frame; a propelling motor in driving connection with some of the vehicle wheels; motor journal supports depending from said frame; means for floating the journals of the motor in said motor journal supports; a reach rod structure supported by the wheels that are initially driven by universal joints whose centers are normally substantially included in the axis of rotation of the motor; and a cushion support for said frame and supported by the reach rod structure.

8. An automobile including a vehicle body carrying frame; front and rear vehicle wheels for supporting said frame; a propelling motor in driving connection with some of the vehicle wheels; motor journal supports depending from said frame and flexibly connected therewith; means for floating the journals of the motor in said motor journal supports; a reach rod structure supported by the wheels that are initially driven by universal joints whose centers are normally substantially included in the axis of rotation of the motor; and a cushion support for said frame and supported by the reach rod structure.

9. An automobile including a vehicle body carrying frame; front and rear vehicle wheels for supporting said frame; a propelling motor in driving connection with some of the vehicle wheels; motor journal supports depending from said frame and connected therewith by universal joints; means for floating the journals of the motor in said motor journal supports; a reach rod structure supported by the wheels that are initially driven by universal joints whose centers are normally substantially included in the axis of rotation of the motor; and a cushion support for said frame and supported by the reach rod structure.

10. An automobile including a vehicle body carrying frame; front and rear vehicle wheels for supporting said frame; a propelling motor in driving connection with some of the vehicle wheels and carried by the frame by flexible connection; a reach rod structure supported by the wheels that are initially driven by the motor, and a joint arranged to sustain thrust and downward pressure flexibly connecting a portion of the reach rod structure with the frame; and a cushion support for said frame and supported by the reach rod structure, said cushion support engaging the reach rod structure vehicle between the axes of the front and rear vehicle wheels.

11. An automobile including a vehicle body carrying frame; front and rear vehicle wheels for supporting said frame; a propelling motor in driving connection with some of the vehicle wheels and carried by the frame by flexible connection; a reach rod structure supported by the wheels, that are initially driven by the motor, and flexibly connected with the frame by universal joints whose centers are normally substantially included in the axis of rotation of the motor; and a cushion support for said frame and supported by the reach rod structure, said cushion support engaging the reach rod structure between the axes of the front and rear vehicle wheels.

12. An automobile including a vehicle body carrying frame; front and rear vehicle wheels for supporting said frame; a propelling motor in driving connection with some of the vehicle wheels and carried by the frame by cushion supports permitting the motor bodily to move with respect to the frame; a reach rod structure supported by the wheels, that are initially driven by the motor, and flexibly connected with the frame by universal joints whose centers are normally substantially included in the axis of rotation of the motor; and a cushion support for said frame and supported by the reach rod structure, said cushion support engaging the reach rod structure between the axes of the front and rear vehicle wheels.

13. An automobile including a vehicle body carrying frame; front and rear vehicle wheels for supporting said frame; a propelling motor in driving connection with some of the vehicle wheels; means for floating the journals of the motor upon the frame; a reach rod structure supported by the wheels that are initially driven by universal joints whose centers are normally substantially included in the axis of rotation of the motor; and a cushion support for said frame and supported by the reach rod structure, said cushion support engaging the reach rod structure between the axes of the front and rear vehicle wheels.

14. An automobile including a vehicle body carrying frame; front and rear vehicle wheels for supporting said frame; a propelling motor in driving connection with some of the vehicle wheels; motor journal supports depending from said frame; means for floating the journals of the motor in said motor journal supports; a reach rod structure supported by the wheels that are initially driven by universal joints whose centers are normally substantially included in the axis of rotation of the motor; and a cushion support for said frame and supported by the reach rod structure, said cushion support engaging the reach rod structure between the axes of the front and rear vehicle wheels.

15. An automobile including a vehicle body carrying frame; front and rear vehicle wheels for supporting said frame; a propelling motor in driving connection with some of the vehicle wheels; motor journal supports depending from said frame and flexibly connected therewith; means for floating the journals of the motor in said motor journal supports; a reach rod structure supported by the wheels that are initially driven by universal joints whose centers are normally substantially included in the axis of rotation of the motor; and a cushion support for said frame and supported by the reach rod structure, said cushion support engaging the reach rod structure between the axes of the front and rear vehicle wheels.

16. An automobile including a vehicle body carrying frame; front and rear vehicle wheels for supporting said frame; a propelling motor in driving connection with some of the vehicle wheels; motor journal supports depending from said frame and connected therewith by universal joints; means for floating the journals of the motor in said motor journal supports; a reach rod structure supported by the wheels that are initially driven by universal joints whose centers are normally substantially included in the axis of rotation of the motor; and a cushion support for said frame and supported by the reach rod structure, said cushion support engaging the reach rod structure between the axes of the front and rear vehicle wheels.

17. An automobile including a vehicle body carrying frame; front and rear vehicle wheels for supporting said frame; a propelling motor in driving connection with some of the vehicle wheels and carried by the frame by flexible connection to permit the motor to turn or rotate; a reach rod structure supported by the wheels, that are initially driven by the motor, and flexibly connected with the frame by joints whose centers are normally substantially included in the axis of rotation of the motor; and a cushion support for said frame and supported by the reach rod structure.

In witness whereof, I hereunto subscribe my name this twenty-first day of October, A. D. 1913.

ROLAND S. FEND.

Witnesses:
G. L. CRAGG,
ETTA L. WHITE.